Aug. 26, 1930.  A. A. SMALLHOUSE  1,774,295

AIR AND MOISTURE SEPARATOR FOR COMPRESSED AIR SYSTEMS

Filed Oct. 15, 1927

INVENTOR.
Albert A. Smallhouse,
BY
ATTORNEY.

Patented Aug. 26, 1930

1,774,295

UNITED STATES PATENT OFFICE

ALBERT A. SMALLHOUSE, OF LOS ANGELES, CALIFORNIA

AIR AND MOISTURE SEPARATOR FOR COMPRESSED-AIR SYSTEMS

Application filed October 15, 1927. Serial No. 226,497.

This invention relates to air and moisture separators for compressed air systems, and has for an object the provision of a separator unit adapted to be connected with the main air line at any suitable point, but preferably between a compressed air tank at a point where the compressed air is delivered from the tank for use, and so arranged that the air delivered from the compressor must pass through a plurality of chambers, bypasses and the like successively before delivery to the tank.

It is an object to provide an air filter or separator composed of a plurality of sections, detachably held together and arranged in a bank or unit for attachment to a compressed air system.

A further object is to provide a peculiar and effective arrangement of chambers and passages for the air between the inlet and outlet, together with a multiplicity of cooling fins or vanes arranged internally and externally of the separator unit, in such a manner that the volume of air passing through the separator will be exposed to a maximum area of metal.

In the consideration of this invention it will be understood that when air is compressed for storage and use it is necessarily heated to a substantial extent above atmospheric temperatures, and when so heated has a larger moisture carrying capacity than when cool. Accordingly, when the air is cooled in the tank, condensation takes place and the air delivered from the tank for use contains a substantial quantity of moisture.

It is an object, therefore, of this invention to provide means for eliminating the moisture from the air before the air is delivered to a point of use or discharge.

Other objects may appear as the description of my improvements progresses.

In the accompanying drawings I have shown a preferred embodiment of my invention, subject to modification within the scope of the appended claims without departing from the spirit thereof.

Figure 1:
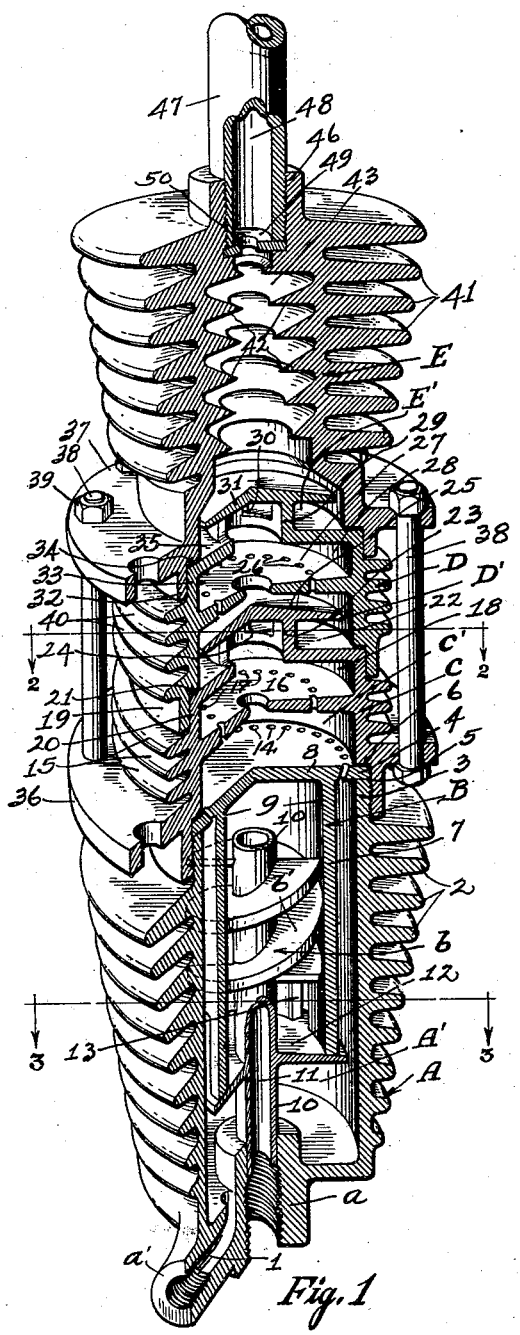
Fig. 1 is a sectional elevation of an assembled separator unit as seen on line 1—1 of Fig. 2.
Figure 2:
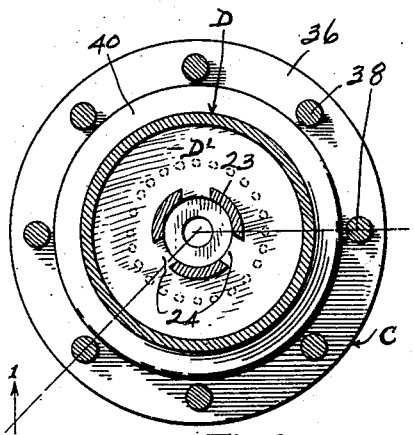
Fig. 2 is a sectional plan on line 2—2 of Fig. 1.
Figure 3:
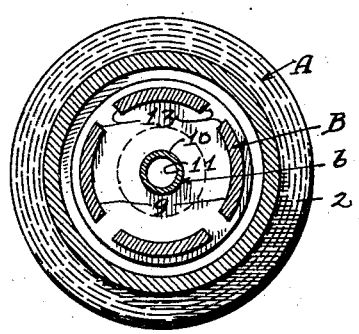
Fig. 3 is a sectional plan on line 3—3 of Fig. 1.

As shown in Fig. 1, my improvements include a unit embodying separable sections A, B, C, D and E, arranged in tandem formation and concentrically mounted in axial alinement. Other sections of the character of those designated at C and D may be interposed between the sections A and E, if desired, in order to afford a greater amount of cooling surface, depending upon requirements of use.

Section A is at the bottom of the unit and is provided with an inlet $a$, internally threaded to receive a section of pipe by means of which the inlet may be connected with a compressed air storage tank. Said section is also provided with a drain outlet $a'$ having a passage 1 therein communicating with a chamber A' within the section A.

A plurality of annular cooling fins as at 2, 2, etc., are provided on the exterior of the section A, which preferably increase in diameter from the bottom upwardly of the section, as shown.

Said member A is provided with an externally threaded nipple 3 at its upper end, on the end of which a flange 4 of the section B is supported. The member C is provided with an internally threaded nipple 5 which threads onto the nipple 3 of section A, and an annular shoulder 6 formed internally of the member C abuts the upper edge of the flange 4 of member B. Thus, when the members A and C are secured together the member B is supported intermediate said members.

Member B has a depending cylindrical portion 7 of smaller diameter than the chamber A' of the section A, and a web 8 at the upper end of said cylindrical portion by means of which a chamber 9 is formed within the portion 7. A member $b$ is provided internally of the member B, and includes a tubular portion 10 which has an inlet passage 11 formed centrally therein, and is adapted to be removably connected with the inlet $a$ of the section A.

Member $b$ has a flange 12 which abuts the lower end of the cylindrical portion 7 of member B, and above said flange a helical vane $b'$ is formed around the central tubular portion 10, the periphery of the vane $b'$ fitting closely the periphery of the cylinder 9 within the member B.

The chamber 9 is in communication with the chamber A' at a plurality of points immediately above the flange 12 by means of apertures 13, 13, etc., formed in the cylinder 7. Thus, the air is admitted from a pressure line through the inlet A and tube 10 of member B, into the upper portion of chamber 9, and thence downwardly over the helically vaned portion $b'$ into the lower portion of chamber 9, and outwardly through the ports 13 into the chamber A'.

The web 8 of member B is provided with a plurality of apertures 14, 14, etc., by means of which the air from chamber A' is admitted to a chamber C' within the member C. Member C is provided with a plurality of annular fins 15, 15, etc., on the exterior thereof, and a horizontal partition 16 having a plurality of perforations 17 therein for affording communication between the chamber C' and an upper chamber 18.

Member D has an annular portion 19 at the lower end thereof which telescopes a portion 20 of member C, and said member also has an annular shoulder 21 which rests upon the top web 22 of member C. Said member C has an outlet portion 23 provided with ports 24 therein, below a hood-like flange 25 which is spaced from the web 22 and is of smaller diameter than the chamber D' formed in the member D.

Thus, the chamber 18 communicates with the chamber D' by means of the ports 24, so that the air is delivered into the chamber D' and from thence through a series of perforations 26, etc., formed in a partition 27 of the member D to a chamber 28 in the upper end of said member D.

Member D has an outlet portion 29 with ports 30 formed therein and a hooded flange 31 above, which is of smaller diameter than the chamber E' formed in the lower portion of member E. Thus the air is delivered in turn from the chamber 28, through ports 30 into the chamber E'.

Member E has an annular portion 32 which telescopes a smaller portion 33 at the upper end of portion D, and an annular shoulder 34 is provided therein which rests upon the top portion 35 of member D. Members C and E are provided with annular flanges 36 and 37, respectively, which are connected by means of a plurality of bolts 38, 38, etc., having nuts 39, 39, etc., on their ends, by means of which all of the sections A, B, C, D and E are detachably held together.

Member D is provided with a plurality of annular cooling fins 40 and member E has similar fins 41, 41, etc., on the exterior thereof, and is also provided with a plurality of fins 42, 42, etc., on the interior which provide an internally ribbed chamber 43 above the chamber E', as shown.

The member E is provided with an outlet 46 to which a pipe 47 may be attached, so that the chamber 43 will communicate with the passage 48 in said pipe for delivering the air from the separator unit to a point of use.

In operation, the assembled units composed of members A, B, C, D and E are attached together, as shown and described, the inlet $a$ is connected with the compressed air storage tank, and the outlet $a'$ is connected by means of pipe 47 with a point of discharge. When the compressed air line is open the air will flow through the inlet $a$ and tube 10 into chamber 9, thence downwardly in a helical path to the bottom of said chamber 9 and outwardly through port 13 into said chamber A'.

From the chamber A' the air will move upwardly through ports 14 into chamber C', thence through ports 17 into chamber 18, thence through ports 24 into chamber D', thence through ports 26 into chamber 28, thence through ports 30 into chamber E' and outwardly through chamber 43 and pipe 47.

The portions 8, 16, 22, 27 and 35 constitute baffles against which the air impinges for effecting condensation.

The circuitous path of the air through the separator causes contact of the volume of air with a maximum metal surface, which is cooled by means of the external and internal fins so that the moisture in the air will be retained in the separator, while the dry air is discharged therefrom under pressure.

The arrangement of the communicating ports between the several successive chambers in the device permits the accumulated moisture in said chambers to flow downwardly by gravity into the lower part of the chamber A', from which it may be drained when and as necessary, through the drain outlet $a'$.

While the separator is in use said drain outlet is adapted to be closed by a plug or valve threaded into or suitably attached to the outlet.

The several sections of the device are preferably formed of a non-corrosive metal and the joints between the sections being packed by suitable gaskets for rendering the separator air and water tight.

It will be observed that the structure and arrangement of my separator are of such character that the several sections may be readily dis-assembled for the purpose of cleaning, or otherwise.

The sum of the areas of the communicating ports as at 14, 17, and 26 in the baffles or partitions between the chambers is substantially less than the area of the inlet passage 11, in order that the flow of air may be substantially retarded in each of the compartments for the purpose of effecting condensation.

Likewise, the outlet passage 48 is restricted by means of a disc 49 interposed between the chamber 43 in member E and the inner end of pipe 47. Said disc has a restricted orifice 50 therein which reduces the volume of air discharged from the outlet. The size of the orifice 50 may be made to conform to the volume of air required for a particular purpose at the point of discharge, in order to prevent an undue accumulation of moisture in the pipe 48 after the air has been discharged from the separator unit.

It will be observed also that the arrangement of the inlet section A, together with the section B is such that a maximum condensation will be effected within the chamber 9 as the air enters the separator. The liquid accumulated in said chamber will flow downwardly over the helical vane $b'$ into the bottom of chamber 9, and outwardly through the ports 13 into the bottom of chamber A', from which it may be drained through the passage 1 in outlet $a'$.

As the air flows through the succeeding chambers whatever moisture is accumulated therein will flow downwardly through the ports in the baffles, between said chambers and into chamber A'.

It is important that all of the sections be provided with a maximum area of surface for exposure to the atmosphere, so that the entire separator unit may be kept at substantially atmospheric temperature. The air delivered to the separator is, of course, substantially above atmospheric temperature, and the impingement of the air on the several baffles in the separator will substantially cool the air and effect an almost complete condensation so that only dry air or substantially so will be delivered through the outlet pipe 47.

It will also be observed that the successive chambers through which the air must pass from the inlet to the outlet are so arranged that communication therebetween can be effected only by conducting the air through a circuitous path, and that no opportunity is afforded for a direct passage of air from one chamber to another. This insures contact of the volume of air with a maximum area of metal in each of the chambers of the separator before it can be discharged therefrom to a successive chamber.

Other benefits will readily appear to those familiar with the art.

What I claim is:

1. An air and moisture separator comprising a plurality of sections detachably held together, and provided with inter-communicating chambers, one of said sections having an inlet and another of said sections having an outlet, certain of said sections having baffles and said inlet section having a helical passage for directing air downwardly, ports being provided in said sections and arranged for affording communication between said chambers in such a manner that the volume of air will be moved in a tortuous path upwardly between said inlet section and said outlet, for the purpose described.

2. An air and moisture separator comprising a plurality of sections detachably secured together and axially alined, said sections having externally formed cooling fins thereon, a series of baffles internally formed in said sections providing a plurality of inter-communicating chambers, one of said sections having an inlet and a helical passage leading downwardly, another of said sections having an outlet, whereby a volume of air may be caused to flow downwardly and thence successively through said chambers in a tortuous path upwardly to the outlet for effecting condensation of the liquid content of the air.

3. An air and moisture separator comprising an inlet section having inner and outer chambers, means for admitting air to the top of the inner chamber, means for directing the flow of air downwardly and in a helical path to the bottom of said inner chamber, and thence outwardly into said outer chamber, a plurality of additional sections connected with said inlet section and provided with internal baffles forming a series of inter-communicating chambers arranged to permit the flow of air from said outer chamber through said series of chambers in an indirect path, for effecting condensation of the liquid content of the air.

4. An air and moisture separator comprising a plurality of telescoping concentrically arranged sections, detachably held together and including an inlet section, an outlet section, and a plurality of intermediate sections, said inlet section having inner and outer chambers, means for admitting air to the upper portion of said inner chamber, means for effecting the flow of air downwardly in a helical path from the upper portion to the lower portion of said inner chamber and into said outer chamber, a plurality of baffles internally formed in said sections and providing a succession of inter-communicating chambers arranged to effect the flow of air therethrough in an indirect path, a plurality of internal baffles in said outlet section, said outlet section having an outlet, and means disposed at said outlet for restricting the flow of air therethrough.

5. An air and moisture separator comprising a plurality of telescoping concentrically arranged sections, detachably held together and including an inlet section, an outlet section, and a plurality of intermediate sections, said inlet section having inner and outer chambers, means for admitting air to the upper portion of said inner chamber, means for effecting the flow of air downwardly in a helical path from the upper portion to the lower portion of said inner chamber and into said outer chamber, a plurality of baffles internally formed in said intermediate sections and providing a succession of intercommunicating chambers arranged to effect the flow of air therethrough in an indirect path, a plurality of internal baffles in said outlet section, said outlet section having an outlet, means disposed at said outlet for restricting the flow of air therethrough, and means formed on said inlet section for draining the products of condensation therefrom.

6. An air and moisture separator comprising a plurality of sections detachably held together, and provided with an inlet and an outlet at its opposite extremities, a plurality of internal baffles formed in said sections and providing a succession of compartments, ports formed in said baffles for affording communication between said compartments, the area of the ports between adjacent compartments being less than the area of said inlet for retarding the flow of air through said compartments, and means for restricting the discharge of air through said outlet.

7. An air and moisture separator comprising a plurality of sections detachably held together, and provided with an inlet and an outlet at its opposite extremities, a plurality of internal baffles formed in said sections and providing a succession of compartments, ports formed in said baffles for affording communication between said compartments, the area of the ports between adjacent compartments being less than the area of said inlet for retarding the flow of air through said compartments, means for restricting the discharge of air through said outlet, cooling fins being formed on each of said sections, and means for draining the products of condensation therefrom.

8. An air and moisture separator comprising outer and inner members mounted in spaced relation one within the other and forming an annular passage therebetween, said outer member having an inlet for air, the upper portion of the chamber in the inner member being in communication with said inlet, the lower portion of the chamber of the inner member being in communication with the chamber of the outer member, means in the inner member for directing air downwardly in a helical path to the chamber of the outer member, and outlet means at the top of the chamber of the outer member for discharging the air therefrom.

9. An air and moisture separator as characterized in claim 8 including a plurality of chambers above said outlet means arranged in inter-communication whereby the air from the said outer member may be directed upwardly in a tortuous path through said chambers.

10. An air and moisture separator comprising outer and inner members mounted in spaced relation one within the other and forming an annular passage therebetween, said outer member having an air inlet, the upper portion of the chamber in the inner member being in communication with said inlet, the lower portion of the chamber of the inner member being in communication with the outer member, means in the inner member for directing air downwardly in a helical path to the chamber of the outer member, outlet means at the top of the chamber of the outer member, a plurality of chambers above said outlet means arranged in inter-communication, whereby the air from said outer member may be directed upwardly in a tortuous path thru said chambers, and an outlet member in communication with the uppermost of said chambers for discharging the air from the separator, said outer member having means for draining moisture therefrom.

ALBERT A. SMALLHOUSE.